United States Patent
Cruz et al.

(10) Patent No.: US 11,807,532 B2
(45) Date of Patent: *Nov. 7, 2023

(54) METHOD OF RECOVERING A HYDROGEN ENRICHED PRODUCT AND CO2 IN A HYDROGEN PRODUCTION UNIT

(71) Applicant: UOP LLC, Des Plaines, IL (US)

(72) Inventors: Addison Cruz, Chicago, IL (US); Bradley Russell, Carol Stream, IL (US); Erick J. Bennett, III, Orland Park, IL (US); William Cady, Chicago, IL (US); Kurt Kraus, Tulsa, OK (US); Stefano Bietto, Tulsa, OK (US); Kyle Cuellar, Fulshear, TX (US); Oluwaseyi Kayode, Houston, TX (US)

(73) Assignee: UOP LLC, Des Plaines, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/451,941

(22) Filed: Oct. 22, 2021

(65) Prior Publication Data

US 2022/0306464 A1 Sep. 29, 2022

Related U.S. Application Data

(60) Provisional application No. 63/167,341, filed on Mar. 29, 2021.

(51) Int. Cl.
*C01B 3/38* (2006.01)
*C01B 3/48* (2006.01)
(Continued)

(52) U.S. Cl.
CPC .............. *C01B 3/382* (2013.01); *B01D 3/143* (2013.01); *B01D 53/047* (2013.01);
(Continued)

(58) Field of Classification Search
CPC C01B 3/382; C01B 3/386; C01B 3/48; C01B 3/508; C01B 32/50;
(Continued)

(56) References Cited

U.S. PATENT DOCUMENTS 3,742,183 A  6/1973 Castro et al.
4,300,009 A  11/1981 Haag et al.
(Continued)

FOREIGN PATENT DOCUMENTS

FR  2961802 A1  12/2011
WO  2007123673 A1  11/2007
WO  2019133598 A1  7/2019

OTHER PUBLICATIONS

International Search Report from corresponding PCT application No. PCT/US2022/071388, dated Jul. 14, 2022.
(Continued)

*Primary Examiner* — Steven J Bos
*Assistant Examiner* — Syed T Iqbal

(57) ABSTRACT

A process and apparatus for producing a hydrogen-enriched product and recovering $CO_2$ from an effluent stream from a hydrogen production unit are described. The effluent from the hydrogen production unit, which comprises a mixture of gases comprising hydrogen, carbon dioxide, water, and at least one of methane, carbon monoxide, nitrogen, and argon, is sent to a PSA system that produces at least two product streams for separation. The PSA system that produces at least two product streams separates the gas mixture into a high-pressure hydrogen stream enriched in hydrogen, optionally a second gas stream containing the majority of the impurities, and a low-pressure tail gas stream enriched in $CO_2$ and some impurities. The $CO_2$-rich tail gas stream is compressed and sent to a $CO_2$ recovery unit, where a $CO_2$-enriched stream is recovered. The $CO_2$-depleted over-
(Continued)

head gas stream is recycled to the PSA system that produces at least two product streams.

15 Claims, 6 Drawing Sheets

(51) Int. Cl.
*C01B 32/50* (2017.01)
*B01D 53/047* (2006.01)
*B01D 3/14* (2006.01)
*B01D 53/04* (2006.01)
*B01D 53/26* (2006.01)
*C01B 3/50* (2006.01)

(52) U.S. Cl.
CPC ......... *B01D 53/0438* (2013.01); *B01D 53/26* (2013.01); *C01B 3/386* (2013.01); *C01B 3/48* (2013.01); *C01B 3/508* (2013.01); *C01B 32/50* (2017.08); *B01D 2256/16* (2013.01); *B01D 2256/22* (2013.01); *B01D 2257/102* (2013.01); *B01D 2257/108* (2013.01); *B01D 2257/11* (2013.01); *B01D 2257/502* (2013.01); *B01D 2257/504* (2013.01); *B01D 2257/7025* (2013.01); *B01D 2257/80* (2013.01); *B01D 2259/402* (2013.01); *B01D 2259/4003* (2013.01); *B01D 2259/40015* (2013.01); *B01D 2259/40043* (2013.01); *B01D 2259/40079* (2013.01); *B01D 2259/40081* (2013.01); *C01B 2203/0233* (2013.01); *C01B 2203/0261* (2013.01); *C01B 2203/0283* (2013.01); *C01B 2203/042* (2013.01); *C01B 2203/0833* (2013.01); *C01B 2203/1241* (2013.01); *C01B 2203/1288* (2013.01); *C01B 2203/148* (2013.01); *C01B 2203/1628* (2013.01)

(58) Field of Classification Search
CPC .... C01B 2203/0233; C01B 2203/0261; C01B 2203/0283; C01B 2203/042; C01B 2203/0833; C01B 2203/1241; C01B 2203/1288; C01B 2203/148; C01B 2203/1628; B01D 3/143; B01D 53/0438; B01D 53/047; B01D 53/26; B01D 2256/16; B01D 2256/22; B01D 2257/102; B01D 2257/108; B01D 2257/11; B01D 2257/502; B01D 2257/504; B01D 2257/7025; B01D 2257/80; B01D 2259/40015; B01D 2259/4003; B01D 2259/40043; B01D 2259/40079; B01D 2259/40081; B01D 2259/402; F25J 3/0266

See application file for complete search history.

(56) References Cited

U.S. PATENT DOCUMENTS

| | | | |
|---|---|---|---|
| 4,772,420 A * | 9/1988 | Pinto | C01B 3/56 252/376 |
| 4,963,339 A | 10/1990 | Krishnamurthy et al. | |
| 4,992,605 A | 2/1991 | Craig et al. | |
| 6,875,008 B1 | 4/2005 | Martin et al. | |
| 7,776,208 B2 | 8/2010 | Guo | |
| 7,999,142 B2 | 8/2011 | Kalnes et al. | |
| 8,021,464 B2 | 9/2011 | Gauthier et al. | |
| 3,039,682 A1 | 10/2011 | McCall et al. | |
| 8,198,492 B2 | 6/2012 | Brady et al. | |
| 8,241,400 B2 | 8/2012 | Grover | |
| 8,394,174 B2 | 3/2013 | Chen et al. | |
| 8,431,755 B2 | 4/2013 | Vauk | |
| 8,865,953 B2 | 10/2014 | Brady et al. | |
| 9,062,258 B2 | 6/2015 | Mayeur et al. | |
| 11,326,110 B2 | 5/2022 | Roy et al. | |
| 2004/0230085 A1 | 11/2004 | Jakkula et al. | |
| 2010/0288123 A1 | 11/2010 | Chen et al. | |
| 2012/0121497 A1 | 5/2012 | Terrien et al. | |
| 2015/0376801 A1 | 12/2015 | Bairamijamal | |
| 2016/0250580 A1 * | 9/2016 | Monereau | B01D 53/047 95/139 |
| 2016/0312125 A1 | 10/2016 | Linck | |
| 2018/0216010 A1 | 8/2018 | Hong | |
| 2019/0135626 A1 * | 5/2019 | Rafati | F25J 3/0295 |
| 2019/0275460 A1 | 9/2019 | Zhong et al. | |

OTHER PUBLICATIONS

Written Opinion from corresponding PCT application No. PCT/US2022/071388, dated Jul. 14, 2022.
International Search Report from PCT application No. PCT/US2022/071386 dated Jul. 13, 2022.
Written Opinion from PCT application No. PCT/US2022/071386 dated Jul. 13, 2022.
Kraus, Kurt el al., U.S. Appl. No. 17/451,932 entitled *Active and Passive Combustion Stabilization For Burners For Highly And Rapidly Varying Fuel Gas Compositions filed Oct. 22, 2021.
International Search Report from PCT application No. PCT/US2022/071384 dated Jul. 6, 2022.
International Search Report from PCT application No. PCT/US2022/071385 dated Jul. 6, 2022.

* cited by examiner

METHOD OF RECOVERING A HYDROGEN ENRICHED PRODUCT AND CO2 IN A HYDROGEN PRODUCTION UNIT

RELATED APPLICATIONS

This application claims the benefit of U.S. Provisional Application Ser. No. 63/167,341, filed Mar. 29, 2021, entitled Method of Recovering Hydrogen and $CO_2$ in a Hydrogen Production Unit, which is incorporated herein in its entirety.

BACKGROUND

Hydrogen is expected to have significant growth potential because it is a clean-burning fuel. However, hydrogen production is traditionally a significant emitter of $CO_2$, and government regulations and societal pressures are increasingly taxing or penalizing $CO_2$ emissions or incentivizing $CO_2$ capture. Consequently, significant competition to lower the cost of hydrogen production while recovering the byproduct $CO_2$ for subsequent geological sequestration to capture the growing market is anticipated. $CO_2$ can be separated as a vapor to be supplied to a common pipeline, but more likely it will need to be produced in liquefied form for easy transport by truck or ship due to the current lack of $CO_2$ pipeline infrastructure in certain areas of the world.

The desired level of $CO_2$ emissions mitigated will depend on regional economic conditions, with some hydrogen producers prioritizing maximizing hydrogen production with $CO_2$ capture, others prioritizing minimal $CO_2$ emissions with hydrogen production, and some falling somewhere in-between. Another important factor is the reformer technology chosen for a given hydrogen production unit. For steam reforming plants, 50% to 60% $CO_2$ capture may be sufficient, while greater than 90% or greater than 95% may be expected for an autothermal reformer (ATR), gasifier, or partial oxidation (POX) reformer.

Most existing hydrogen production processes utilize pressure swing adsorption (PSA) to recover high-purity product hydrogen from shifted syngas. The low-pressure tail gas stream from the PSA unit is typically combusted to generate heat or steam for the process. If no stream is sent to a combustor, a purge is required to prevent impurity build-up in the process.

U.S. Pat. No. 8,021,464 describes a process for the combined production of hydrogen and $CO_2$ from a mixture of hydrocarbons which are converted to syngas. The syngas is separated in a PSA unit into a hydrogen-enriched stream and a PSA offgas stream. The PSA offgas is compressed and dried, followed by several successive steps of condensing and separating the $CO_2$-rich condensate with the temperature being reduced at each step, the temperature ranging from ambient to −56° C. However, the process results in a purge stream containing a significant amount of $CO_2$ which must be removed from the process. A permeate module can be used to improve the separation, but at the cost of increased power requirements.

U.S. Pat. No. 8,241,400 describes a process for recovering hydrogen and $CO_2$ from a mixture of hydrocarbons utilizing a system that includes a reformer unit, an optional water gas shift reactor, a PSA unit, and a cryogenic purification unit or a catalytic oxidizer. The PSA unit produces three streams: a high-pressure hydrogen stream, a low-pressure $CO_2$ stream, and a $CH_4$ rich stream which is withdrawn during a $CO_2$ co-purge step. Purified $CO_2$ from the $CO_2$ purification unit in the process is used as the co-purge in the PSA unit. The adsorption step is run at a pressure of about 250 psig to about 700 psig. The pressure during the co-purge step is in the range of about 300 psig to about 800 psig, and the $CO_2$ co-purge stream is preferably introduced at a pressure higher than the pressure during the adsorption step.

The use of a second high-pressure feed stream (the $CO_2$ co-purge stream) increases the cost and complexity of the process in U.S. Pat. No. 8,241,400. The necessity of having a segmented adsorber (or two separate vessels) with an isolation valve between the two and an intermediate side-draw further increases the cost and complexity of the process.

Therefore, there is a need for improved hydrogen separation processes with improved, cost-effective $CO_2$ recovery.

DETAILED DESCRIPTION

Figure 1:
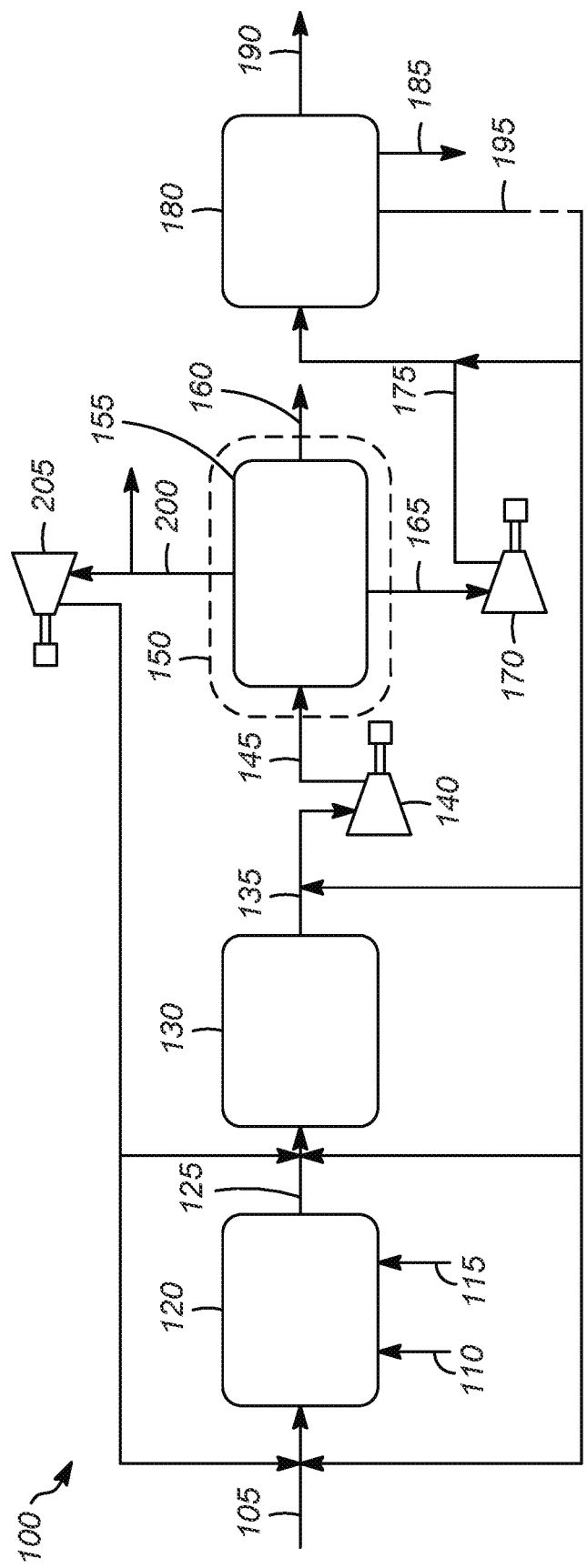
FIG. 1 is an illustration of one embodiment of a method of separating a hydrogen stream and a $CO_2$ stream from an effluent stream of a hydrogen production unit using a PSA system that produces at least two product streams of the present invention.

The process produces a hydrogen-enriched product and allows recovery of $CO_2$ from an effluent stream from a hydrogen production unit. The effluent from the hydrogen production unit, which comprises a mixture of gases comprising hydrogen, carbon dioxide, water, and at least one of methane, carbon monoxide, nitrogen, and argon is sent to a PSA system that produces at least two product streams for separation. The PSA system that produces at least two product streams separates the gas mixture into at least a high-pressure hydrogen stream enriched in hydrogen, and a low-pressure tail gas stream enriched in $CO_2$ and some impurities. In some embodiments, there can be a second gas stream containing the majority of the impurities. The $CO_2$-rich tail gas stream is compressed and sent to a $CO_2$ recovery unit, where a high-purity liquid $CO_2$ stream is recovered. The $CO_2$-depleted overhead gas stream is recycled to the PSA system that produces at least two product streams. The impurity-rich second stream, if present, can be combusted in a separate fired heater or waste heat boiler to generate heat and steam for the upstream process or combusted in a furnace in the hydrogen production unit. In some embodiments, a portion of the impurity-rich second stream may be recycled upstream to the reformer unit or water-gas shift unit to capture additional hydrogen and convert CO to $CO_2$, allowing for increased overall recovery.

Utilizing a PSA system that produces at least two product streams comprising a three-product PSA unit or two PSA units in series instead of a conventional PSA offers innovation and flexibility, reducing downstream equipment size and utilities, and increasing the amount of $CO_2$ captured (since the impurity-rich stream does not contain significant amounts of $CO_2$).

The PSA system that produces at least two product streams may be a three-product PSA unit with three product streams, a PSA unit with two product streams, or two PSA units each with two product streams in series with the high-pressure product stream from the first PSA unit feeding into the second PSA unit.

The three-product PSA unit comprises four or more PSA adsorption vessels. There are generally at least six vessels, and typically eight to fourteen vessels. The vessels comprise one or more adsorbent layers, generally one to five, and typically two to three. The percentage of the bed for an adsorption layer is typically between 10% and 100%. Different layers of adsorbent have different selectivity to the components in the overhead stream, as is known to those skilled in the art. Some layers contain adsorbent that is for selective adsorption of $CO_2$ relative to methane, carbon monoxide, nitrogen, argon, and hydrogen, including, but not limited to, layers of activated alumina, silica gel, and sodium Y zeolite. Other layers contain adsorbent that is for selective adsorption of $CO_2$, methane, carbon monoxide, nitrogen, and argon relative to hydrogen, including, but not limited to, layers of activated carbon, silica gel, and molecular sieve zeolite (e.g., 5A or sodium X zeolite). Those of skill in the art will appreciate that other zeolites could be used and will know how to select appropriate adsorbents.

There is a first opening at one end of the vessel, and a second opening at the opposite end. For convenience, the ends will be referred to as the top and the bottom of the vessel. The first opening at the bottom is selectively connected to a high-pressure feed gas inlet line, and a low-pressure tail gas outlet line. The second opening at the top of the vessel is selectively connected to a high-pressure product outlet line, an intermediate pressure vent gas outlet line, and a low-pressure purge gas inlet line. The feed gas enters at high pressure through the first opening at the bottom of the vessel, and a high pressure, co-current adsorption and product removal step takes place with the product exiting the vessel at high pressure through the second opening at the top of the vessel. There is at least one co-current depressurization step, and then an intermediate pressure co-current depressurization and vent gas removal step. The second stream is removed through the opening at the top of the vessel at a second pressure. There is a counter-current blowdown step and a counter-current purge step. The purge gas enters through the opening at the top of the vessel at low pressure. The $CO_2$ can be removed at low pressure through the opening at the bottom of the vessel during either or both of the counter-current blowdown step and the counter-current purge step. There is at least one counter-current re-pressurization step following the counter-current purge and tail gas removal step.

The PSA system that produces at least two product streams may comprise one PSA unit with two product streams, or two PSA units each with two product streams in series. In the single PSA unit with two product streams, the effluent stream is introduced into the PSA unit where it is separated into a low-pressure tail gas stream enriched in $CO_2$ and a high-pressure stream enriched in hydrogen. It may contain a portion of the at least one of the methane, carbon monoxide, nitrogen, and argon.

With the two PSA units in series, the effluent stream is introduced into the first PSA unit with two product streams where it is separated into a low-pressure tail gas stream enriched in $CO_2$ and a high-pressure stream comprising substantially all the hydrogen (e.g., about 85% to about 95%), and a portion of the at least one of the methane, carbon monoxide, nitrogen, and argon. The high-pressure stream is fed to the second PSA unit with two product streams where it is separated into a high-pressure hydrogen stream enriched in hydrogen and a low-pressure stream containing substantially all the methane, carbon monoxide, nitrogen, and argon in the high-pressure stream (e.g., about 95% to about 100%).

The PSA system that produces at least two product streams of the present invention provides several advantages. The second gas stream is not removed at high pressure. With a three-product PSA unit, it is removed at an intermediate pressure between the high pressure at which the hydrogen is removed and the low pressure at which the $CO_2$ is removed, but much closer to the low pressure than to the high pressure. The intermediate pressure is typically less than about 450 kPa. When the PSA system that produces at least two product streams comprises the two PSA units, the second stream is removed at low pressure, typically less than 250 kPa.

In addition, no high-pressure co-purge stream is used. Furthermore, the vessel is not segmented; the second stream is withdrawn through the opening in the top of the vessel. Therefore, there is no need for an isolation valve and a side draw outlet between two adsorbent beds. These factors make the PSA unit with at least two product streams much less complex and less expensive to build and operate than the PSA and process of U.S. Pat. No. 8,241,400.

The source of the feed gas mixture can be any process stream comprising a hydrogen, $CO_2$, and at least one of methane, carbon monoxide, nitrogen, and argon. Suitable process streams include, but are not limited to, process streams from new and existing hydrogen production processes such as steam reforming with an optional gas heated reformer, autothermal reforming with an optional gas heated reformer, gasification, or partial oxidation (POX). Other suitable process streams can be hydrogen containing byproduct streams from petroleum refineries, such as fluidized catalytic cracking (FCC) off gas, or byproduct streams from steel production plants (e.g., blast furnace off gas).

The temperature of the incoming feed gas mixture to the PSA system that produces at least two product streams is typically in the range of about 20° C. to about 60° C., or about 30° C. to about 50° C., or about 40° C. (or any combination of temperature ranges).

The hydrogen concentration in the feed gas mixture to the PSA unit with at least two product streams is generally in the range of about 50 mol % to about 80 mol %. For example, the hydrogen concentration in a steam methane reforming plant hydrogen effluent is about 60 mol % to about 80 mol %, while the hydrogen concentration in a POX reactor is about 50 mol % to about 70 mol %.

About 70% to 90% of the hydrogen in the feed gas mixture to the PSA system that produces at least two product streams is typically recovered in the high-pressure product stream, and in some cases, the high pressure hydrogen stream is substantially free of $CO_2$, methane, carbon monoxide, nitrogen, and argon. It typically contains less than about 1% of the $CO_2$ relative to the feed gas mixture, or less than about 0.1%, or less than about 0.01%. It typically contains less than about 10% of the methane, carbon monoxide, nitrogen, and argon relative to the feed gas mixture, or less than about 5%, or less than about 2%, or less than about 1%, or less than about 0.1%. The high-pressure product stream is typically removed at a high pressure in the range of about 1,000 to about 6,000 kPa, or about 2,000 kPa to about 5,000 kPa, or about 2,500 kPa to about 4,500 kPa.

The low-pressure tail gas stream is typically removed at a low pressure in the range of about 50 kPa to about 250 kPa, or about 100 kPa to about 200 kPa.

The low-pressure tail gas stream typically contains about 95% to 100% of the $CO_2$ in the feed gas mixture. It typically contains about 10% of the hydrogen relative to the feed gas mixture (e.g., about 5% to about 15%), and about 40% of the methane, carbon monoxide, nitrogen, and argon relative to the feed (e.g., about 20% to about 60%).

When the PSA system that produces at least two product streams comprises a three-product PSA unit, the second gas stream is removed at an intermediate pressure between the high pressure and the low pressure, the intermediate pressure is much closer to the low pressure than the high pressure, typically within about 400 kPa of the low pressure, or 300 kPa, or 200 kPa. Typically, the intermediate pressure product stream is removed at a pressure in the range of about 150 kPa to about 450 kPa, or about 250 kPa to about 350 kPa. Although there is some overlap between the intermediate pressure range and the low-pressure range, it is understood that in a particular case, the low pressure will be lower than the intermediate pressure.

The second stream typically contains about 40% to 80% of the methane, carbon monoxide, nitrogen, and argon in the feed gas mixture. It typically contains about 10% of the hydrogen relative to the feed gas mixture (e.g., about 5% to about 25%), and less than about 5% of the $CO_2$ relative to the feed, or less than about 1%, or less than about 0.1%.

All or a portion of the second stream, if present, can be recycled to the hydrogen production process unit, to a water gas shift process unit, and/or to a combustion unit.

When the PSA system that produces at least two product streams comprises a PSA unit, the effluent stream is introduced into the first PSA unit where it is separated into the low-pressure tail gas stream enriched in $CO_2$ (about 95% to 100%) and a high-pressure stream comprising substantially all (e.g. more than 75%, or about 85% to about 95%) of the hydrogen, and a portion (about 50% to about 90%) of the at least one of the methane, the carbon monoxide, the nitrogen, and the argon. The low-pressure tail gas stream has a low pressure of about 50 kPa to about 250 kPa, or about 100 kPa to about 200 kPa. The high-pressure stream has a high pressure in the range of about 1,000 to about 6,000 kPa, or about 2,000 kPa to about 5,000 kPa, or about 2,500 kPa to about 4,500 kPa.

When the PSA system that produces at least two product streams comprises two PSA units in series, the high-pressure stream from the first PSA unit is fed into the second PSA unit where it is separated into the high-pressure hydrogen stream containing substantially all the hydrogen (e.g., about 80% to about 90%) and the second gas stream. The second gas stream comprises substantially all the at least one of the methane, carbon monoxide, nitrogen, and argon (e.g., about 95% to about 100%). The high-pressure hydrogen stream typically has a high pressure in the range of about 1,000 to about 6,000 kPa, or about 2,000 kPa to about 5,000 kPa, or about 2,500 kPa to about 4,500 kPa. In this arrangement, the second stream is a low-pressure stream with a pressure in the range of about 50 kPa to about 250 kPa, or about 100 kPa to about 200 kPa.

The first PSA unit contains adsorbent that is for selective adsorption of $CO_2$ relative to methane, carbon monoxide, nitrogen, argon, and hydrogen, including, but not limited to, layers of activated alumina, silica gel, and sodium Y zeolite. The second PSA unit contains adsorbent that is for selective adsorption of $CO_2$, methane, carbon monoxide, nitrogen, and argon relative to hydrogen, including, but not limited to, layers of activated carbon, silica gel, and molecular sieve zeolite (e.g., 5A or sodium X zeolite). Those of skill in the art will appreciate that other zeolites could be used and will know how to select appropriate adsorbents for the first and second two-product PSA units.

The high-pressure hydrogen stream enriched in hydrogen is recovered.

All or a portion of the second stream, if present, can be sent to one or more of the hydrogen production unit, a WGS unit, and a combustion unit. The second stream can optionally be compressed before being sent to the hydrogen production unit or the WGS unit, if desired.

The tail gas stream is compressed to a pressure in the range of about 3,000 to about 6,000 kPa and sent to a $CO_2$ recovery system. The compressed tail gas stream is dried and cooled to a temperature of about −20° C. to about −50° C. It is separated into a $CO_2$-enriched product stream and an overhead stream containing the hydrogen, some of the carbon dioxide, and some of the at least one of the methane, carbon monoxide, nitrogen, and argon. In some embodiments, the $CO_2$-enriched product stream comprises substantially all (e.g., about 95% to about 100%) of the $CO_2$ in the tail gas stream from the hydrogen PSA unit, and is substantially free of hydrogen, methane, carbon monoxide, nitrogen, and argon. In some embodiments, the $CO_2$-enriched product stream comprises about 95.0 mol % $CO_2$ or more, 98.0 mol % $CO_2$ or more, or about 98.5 mol % $CO_2$ or more, or about 99.0 mol % $CO_2$ or more, or about 99.5 mol % $CO_2$ or more, or about 99.9 mol % $CO_2$ or more.

The $CO_2$ recovery system may include a distillation column, with the $CO_2$-enriched product stream being recovered from the bottom of the column and the lighter components (hydrogen, methane, nitrogen, etc.) being recovered from the top of the column. The $CO_2$ recovery system may instead or also include a single or multiple successive flash vapor-liquid separation vessels with each separator providing in an additional theoretical stage of mass transfer, with the $CO_2$-enriched product being recovered in the liquid stream(s) and the lighter components (hydrogen, methane, nitrogen, etc.) being recovered in the overhead vapor stream (s).

The $CO_2$-enriched stream is recovered. The $CO_2$-enriched stream may be a liquid stream. In some cases, the liquid stream may then be vaporized for use, if desired.

All or a portion of the overhead stream from the $CO_2$ recovery system can be recycled to one or more of the PSA system that produces at least two product streams, the hydrogen production unit, a WGS unit, and the $CO_2$ recovery unit.

One aspect of the invention is a method of producing a hydrogen-enriched product and recovering $CO_2$ from an effluent stream of a hydrogen production unit. In one embodiment, the method comprises: processing a feed stream comprising hydrocarbons or a carbonaceous feedstock to produce a synthesis gas mixture comprising hydrogen, carbon dioxide, water and at least one of methane, carbon monoxide, nitrogen, and argon in the hydrogen production unit; separating the effluent stream comprising the synthesis gas in a pressure swing adsorption (PSA) system that produces at least two product streams into a high-pressure hydrogen stream enriched in hydrogen, and a hydrogen-depleted low-pressure tail gas stream enriched in carbon dioxide; compressing the hydrogen depleted low-pressure tail gas stream in a compressor to form a compressed tail gas stream; separating the compressed tail gas stream in a $CO_2$ recovery system into a $CO_2$-enriched product stream and an overhead stream comprising a portion of the hydrogen, a portion of the carbon dioxide, and the at least one of the methane, the carbon monoxide, the nitrogen, and the argon; and recovering the high-pressure hydrogen stream. By "hydrogen-depleted," we mean the low-pressure tail gas stream has less hydrogen than the effluent stream from the hydrogen production unit, e.g., less than about 20%, or less than about 10%.

When the PSA system that produces at least two product streams comprises a three-product PSA unit, the high-pressure hydrogen stream may be removed during a high pressure, co-current adsorption step in the PSA cycle, a second gas stream may be removed during co-current depressurization step in the PSA cycle, and the low-pressure $CO_2$ stream may be removed during at least one of a counter-current depressurization step and a counter-current purge step in the PSA cycle.

In some embodiments, when the PSA system that produces at least two product streams is a three-product PSA unit, the PSA cycle may comprise:

a high pressure, co-current adsorption and hydrogen removal step;

at least one co-current depressurization step following the high pressure, co-current adsorption step and hydrogen removal step;

a co-current depressurization and second gas removal step following the at least one co-current depressurization step;

a counter-current blowdown step and $CO_2$ removal step following the intermediate pressure co-current depressurization and second gas removal step;

a counter-current purge and $CO_2$ removal step following the counter-current blowdown step;

at least one counter-current re-pressurization step following the counter-current purge and $CO_2$ removal step; and optionally a co-current feed re-pressurization step following the at least one counter-current re-pressurization step or a counter-current product re-pressurization following the at least one counter-current re-pressurization step.

In some embodiments, the PSA system comprises one PSA unit, or two PSA units and separating the effluent stream comprises: introducing the effluent stream into the first PSA unit and separating the effluent stream into the low-pressure tail gas stream enriched in $CO_2$ and a high-pressure hydrogen stream enriched in hydrogen. In some cases, the high-pressure hydrogen stream can be used as fuel. In other embodiments, the high-pressure stream is separated in the second PSA unit into a second high-pressure hydrogen stream and a second gas stream. The second high-pressure hydrogen stream is substantially free of carbon dioxide, methane, carbon monoxide, nitrogen, and argon, and the second gas stream comprises the at least one of the methane, the carbon monoxide, the nitrogen, and the argon in the overhead stream. The second high-pressure hydrogen stream and the second gas stream are removed from the second PSA unit.

In some embodiments, the $CO_2$ recovery system comprises a refrigerated $CO_2$ fractionation process wherein refrigeration cooling is provided by: at least two refrigeration circuits wherein one of the refrigeration circuits utilizes a portion of the $CO_2$-enriched product stream recovered from a distillation column in the $CO_2$ recovery system; or a single closed loop multi-component mixed refrigerant circuit, as described more fully below.

In some embodiments, the method further comprises at least one of: recycling at least a portion of the second gas stream from the PSA system that produces at least two product streams to the hydrogen production unit; recycling at least a portion of the second gas stream from the PSA system that produces at least two product streams to a water gas shift process unit; and sending at least a portion of the second gas stream from the PSA system that produces at least two product streams to a combustion unit.

In some embodiments, the method further comprises at least one of: recycling at least a portion of the overhead stream to the PSA system that produces at least two product streams; recycling at least a portion of the overhead stream to a water gas shift process unit; and recycling at least a portion of the overhead stream to the $CO_2$ recovery system.

In some embodiments, the method further comprises compressing the effluent stream before separating the effluent stream.

In some embodiments, the process can include a catalytic oxidation (CATOX) reactor on the second stream to recover heat in the form of high-pressure steam from un-converted carbon monoxide and methane from the hydrogen production process and un-recovered hydrogen. Approximately the same amount of heat or steam is produced as when the second stream is sent to a furnace. However, sending it to the CATOX reactor unit can avoid at least a part of the $CO_2$ emissions that would be created from burning these components in a furnace by subsequent recycling of at least a portion of the CATOX product stream back into the PSA system that produces at least two product streams, the hydrogen production unit, the WGS unit, or the $CO_2$ recovery system, increasing the percentage $CO_2$ captured from the process. The CATOX reactor unit can be approximately isothermal, with catalyst on one side of a heat exchanger and boiling water on the other side. For example, the CATOX reactor unit could have a water/steam (reactor) temperature of about 250° C. The scale of the reactor could be relatively small, e.g., a total gas feed rate (fuel gas+oxygen) of 6400 Nm3/hr for a hydrogen production plant capacity of 100,000 Nm$^3$/hr.

In some embodiments, there is a selective bypass arrangement to allow the system to operate in the event there is a problem with the compressor or the $CO_2$ recovery system. In this case, the compressor or $CO_2$ recovery system are bypassed, and the tail gas stream from the PSA system that produces at least two product streams may be sent to a combustion unit in the hydrogen production process unit or elsewhere.

Additional energy recovery can be obtained from the effluent of a WGS unit in the process. The effluent stream from the WGS unit can be heat exchanged with a process stream to form a cooled effluent steam and a pre-heated process stream. Waste heat can be recovered from the cooled effluent stream to generate steam using a process involving a reaction of reversible oligomerization of phosphoric acid. The contact of waste heat with phosphoric acid leads to oligomerization to diphosphoric acid. As a result of the oligomerization, a water molecule splits off and condenses, causing cooling of the waste heat. The pressure is increased on the diphosphoric acid stream. Waste heat then evaporates the water which is absorbed by the diphosphoric acid. This causes de-oligomerization and hydrolysis to occur resulting in conversion back to phosphoric acid and the production of higher value process heat. The pressure is then decreased on the phosphoric acid stream, and the cycle is repeated. The process of waste heat recovery using the reversible oligomerization of phosphoric acid is available from Qpinch of Antwerp, Belgium.

In some embodiments, the method further comprises; drying the compressed tail gas stream in a dryer to form a dried tail gas stream; and cooling the dried tail gas stream in a chiller to form a chilled tail gas stream, and wherein separating the compressed tail gas stream comprises separating the chilled tail gas stream.

In some embodiments, the dried tail gas stream is cooled to a temperature of about −20° C. to about −50° C.

Another aspect of the invention is an apparatus for producing a hydrogen-enriched product and recovering $CO_2$ from an effluent stream of a hydrogen production unit. In one embodiment, the apparatus comprises: a hydrogen production process unit having at least one inlet and at least one outlet, a PSA system having at least an inlet, a high pressure hydrogen outlet, and a low-pressure tail gas outlet, the PSA system inlet in fluid communication with the outlet of the hydrogen production unit; a compressor having an inlet and an outlet, the low-pressure tail gas outlet in fluid communication with the compressor inlet; and a $CO_2$ recovery system having an inlet, a first outlet, and an overhead outlet, the $CO_2$ recovery system inlet in fluid communication with the compressor outlet.

In some embodiments, at least one of: the $CO_2$ recovery system overhead outlet is in fluid communication with the inlet of the PSA system; the $CO_2$ recovery system overhead outlet is in fluid communication with an inlet of a water gas shift process unit; the second gas stream is in fluid communication with an the hydrogen production process unit; wherein the PSA system that produces at least two product streams further comprises a second gas stream outlet, and wherein at least one of: the second gas stream outlet is in fluid communication with an inlet to a water gas shift process unit; the second gas stream outlet is in fluid communication with an inlet to a combustion unit; and the second gas stream outlet is in fluid communication with an inlet to a catalytic oxidation unit, and an outlet of the catalytic oxidation unit is in fluid communication with the inlet of the compressor.

In some embodiments, the apparatus further comprises: a dryer and a chiller positioned between the compressor and the $CO_2$ recovery system; the dryer having an inlet and at least one outlet, the dryer inlet in fluid communication with the compressor outlet; the chiller having a gas inlet, a gas outlet, a chilling fluid inlet and a chilling fluid outlet, the chiller gas inlet in fluid communication with the dryer outlet, the chiller fluid inlet in fluid communication with a source of chilling fluid; and the $CO_2$ recovery system inlet in fluid communication with the chiller gas outlet.

In some embodiments, the PSA system that produces at least two product streams comprises a first PSA unit having an inlet and first and second outlets, and a second PSA unit having an inlet and first and second outlets; the inlet of the first PSA unit comprises the inlet of the PSA system; the first outlet of the first PSA unit comprises the low-pressure $CO_2$ outlet; the inlet of the second PSA unit is in fluid communication with the second outlet of the first PSA unit; and the first outlet of the second PSA unit comprises the high pressure hydrogen outlet and the second outlet of the second PSA unit comprises the second gas outlet.

FIG. 1 illustrates one embodiment of a hydrogen production process 100 incorporating the PSA system that produces at least two product streams of the present invention.

Natural gas 105, oxygen 110, and steam 115 are sent to the ATR/GHR process unit 120. The effluent stream 125 is sent to the WGS unit 130. Other feed streams comprising hydrocarbons that could be used instead of natural gas for ATR/GHR, steam reforming, and POX processes include, but are not limited to, naphtha and liquefied petroleum gas (LPG). The POX and gasification processes could use solid feedstock including, but not limited to, coal and petroleum coke.

The effluent stream 135 from the WGS unit 130 comprises hydrogen, $CO_2$, water, and at least one of methane, carbon monoxide, nitrogen, and argon. It has a temperature of about 30° C. to about 50° C. (after heat recovery and cooling), and a pressure of about 1,000 to about 6,000 kPa.

Effluent stream 135 may be sent to an optional compressor 140 where it can be compressed to a pressure of about 2,800 kPa to about 6,000 kPa. Alternatively, the effluent stream 135 may be sent directly to the PSA system that produces at least two product streams 150 without being compressed.

The compressed effluent 145 is sent to the PSA system 150 with at least two product streams comprising the three-product PSA unit 155 where it is separated into three streams. The high-pressure hydrogen stream 160, which is enriched in hydrogen (e.g., greater than 98%, or greater than 99%, or greater than 99.5%, or greater than 99.9%, or greater than 99.99%) and substantially free of carbon dioxide, methane, carbon monoxide, nitrogen, and argon, is recovered. It has a high pressure of about 1,000 to about 6,000 kPa.

The low-pressure tail gas stream 165 enriched in $CO_2$ comprising substantially all the carbon dioxide is sent to compressor 170. It has a low pressure of about 50 kPa to about 250 kPa. The compressed tail gas stream 175 is sent to a $CO_2$ recovery unit 180 where it is dried to remove water stream 185, cooled to a temperature of about −20° C. to about −50° C., and separated into a bottoms stream 190 and an overhead stream 195. The bottoms stream 190 comprising liquid $CO_2$ is recovered. All or a portion of the overhead stream 195 can be recycled to the $CO_2$ recovery unit 180, the PSA system that produces at least two product streams 150, the WGS unit 130, and/or the ATR/GHR process unit 120.

Second gas stream 200 comprises the water, and a portion of the methane, carbon monoxide, nitrogen, and argon. It has an intermediate pressure of about 50 kPa to about 250 kPa. The second gas stream 200 may optionally be compressed in compressor 205. All or a portion of the second gas stream 200 may be used as fuel, recycled to the WGS unit 130, and/or recycled to the ATR/GHR process unit 120.

Figure 2:
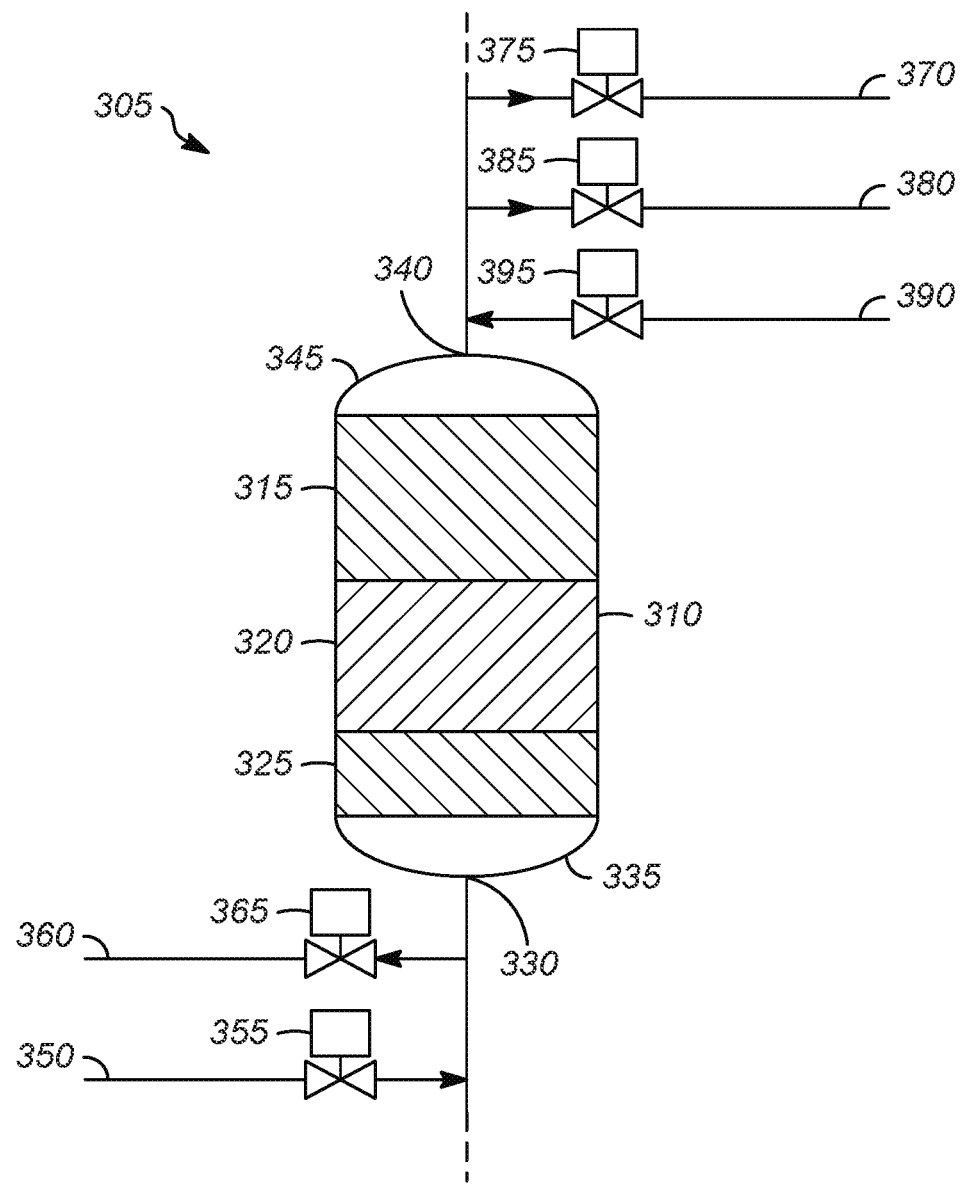
FIG. 2 is an illustration of one embodiment of a three-product PSA unit for use in the PSA system that produces at least two product streams of the present invention.

FIG. 2 illustrates a PSA unit 305 comprising a PSA adsorption vessel 310. The PSA adsorption vessel 310 includes three adsorption layers 315, 320, 325. The PSA adsorption vessel 310 includes a first opening 330 at a first end 335 and a second opening 340 at a second end 345. The first opening 330 is in selective fluid communication with high pressure feed gas inlet line 350 via valve 355 and with low-pressure tail gas outlet line 360 via valve 365. The second opening 340 is in selective fluid communication with high pressure product outlet line 370 via valve 375, intermediate pressure vent gas outlet line 380 via valve 385, and low-pressure purge gas inlet line 390 via valve 395.

During the high pressure, co-current adsorption and hydrogen removal step of the PSA cycle, valves 355 and 375 are open, and valves 365, 385, and 395 are closed, allowing the high-pressure feed gas to enter the PSA adsorption vessel 310 and the high pressure hydrogen stream to exit.

During the at least one co-current depressurization step, valves 355, 365, 375, 385, and 395 are closed.

During the intermediate pressure co-current depressurization and vent removal step, valve 385 is open, and valves 355, 365, 375, and 395 are closed.

During the counter-current blowdown step and tail gas removal step, valve 365 is open, and valves 355, 375, 385, and 395 are closed. The bed de-pressurizes through valve 365, and some of the $CO_2$ is desorbed.

During the counter-current purge and tail gas removal step, valves 365 and 395 are open, and valves 355, 375, and 385 are closed. The purge gas is introduced, and the $CO_2$ is removed.

During the at least one counter-current re-pressurization step, valves 355, 365, 375, 385, and 395 are closed.

Figure 3:
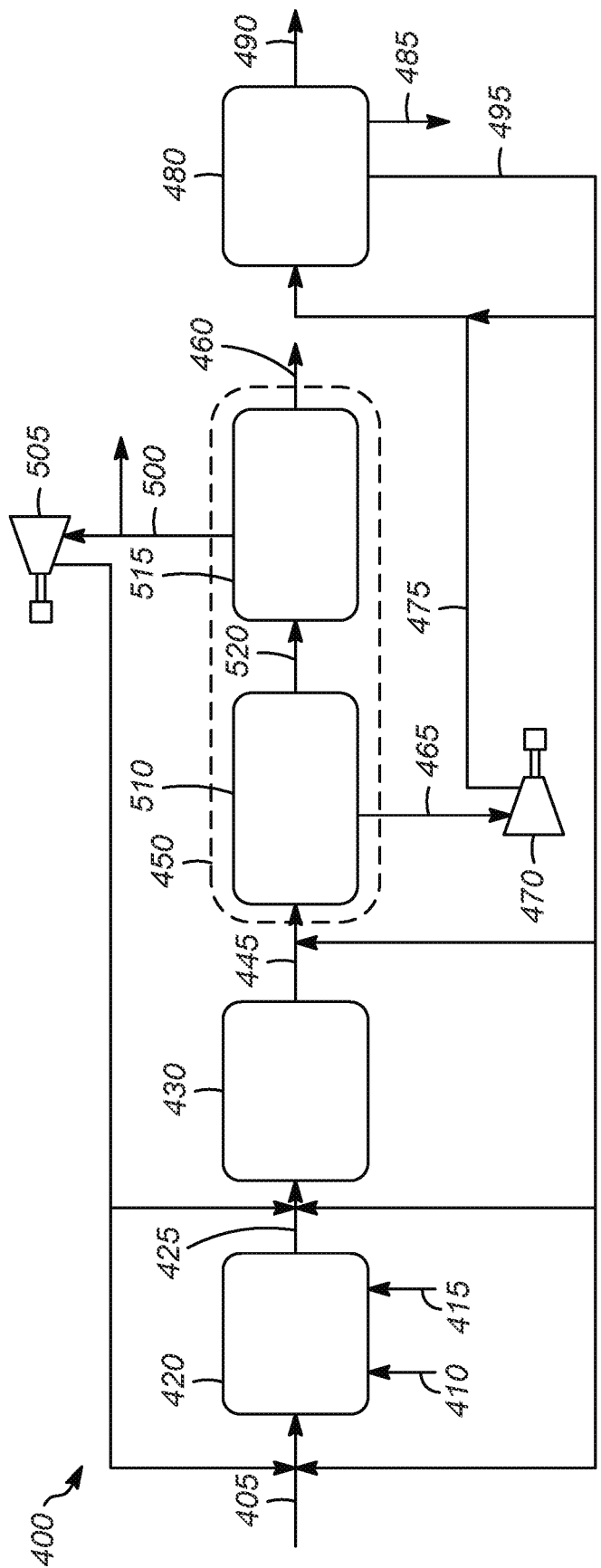
FIG. 3 is an illustration of another embodiment of a method of separating a hydrogen stream and a $CO_2$ stream from an effluent stream of a hydrogen production unit using the PSA system that produces at least two product streams of the present invention.

FIG. 3 illustrates one embodiment of a hydrogen production process 400 incorporating the PSA system that produces at least two product streams of the present invention.

Natural gas stream 405, oxygen stream 410, and steam stream 415 are sent to the ATR/GHR process unit 420. The effluent stream 425 is sent to the WGS unit 430.

The effluent stream 435 from the WGS unit 430 comprises hydrogen, $CO_2$, water, and at least one of methane, carbon monoxide, nitrogen, and argon. It has a temperature of about 30° C. to about 50° C. (after heat recovery and cooling), and a pressure of about 1,000 to about 6,000 kPa.

The effluent stream 445 is sent to the PSA system that produces at least two product streams 450 comprising two PSA units 510, 515. The effluent stream 435 is sent to the first PSA unit 510 where it is separated into a low-pressure tail gas stream 465 enriched in $CO_2$ and high-pressure stream 520 comprising substantially all the hydrogen, and a portion of the methane, the carbon monoxide, the nitrogen, and the argon. Low-pressure tail gas stream 465 has a low pressure of about 50 kPa to about 250 kPa. High-pressure stream 520 has a high pressure of about 1,000 to about 6,000 kPa. High-pressure stream 520 is sent to the second PSA unit 515 where it is separated into high-pressure hydrogen stream 460 and low-pressure second stream 500.

The high-pressure hydrogen stream 460, which is enriched in hydrogen and substantially free of carbon dioxide, methane, carbon monoxide, nitrogen, and argon, is recovered.

The low-pressure tail gas stream 465 enriched in $CO_2$ comprising substantially all the carbon dioxide is sent to compressor 470. The low-pressure compressed tail gas stream 475 has a pressure of about 50 kPa to about 250 kPa. It is sent to a $CO_2$ recovery unit 480 where it is dried to remove water stream 485, cooled to a temperature of about −20° C. to about −50° C., and separated into a bottoms stream 490 and an overhead stream 495. The bottoms stream 490 comprising liquid $CO_2$ is recovered. All or a portion of the overhead stream 495 can be recycled to the $CO_2$ recovery unit 480, the PSA system that produces at least two product streams 450, the WGS unit 430, and/or the ATR/GHR process unit 420.

Second gas stream 500, which comprises the water, and a portion of the methane, carbon monoxide, nitrogen, and argon, is a low-pressure stream with a pressure of about 50 kPa to about 250 kPa. The second gas stream 500 may optionally be compressed in compressor 505. All or a portion of the second gas stream 500 may be used as fuel, recycled to the WGS unit 430, or recycled to the ATR/GHR process unit 420.

Figure 4:
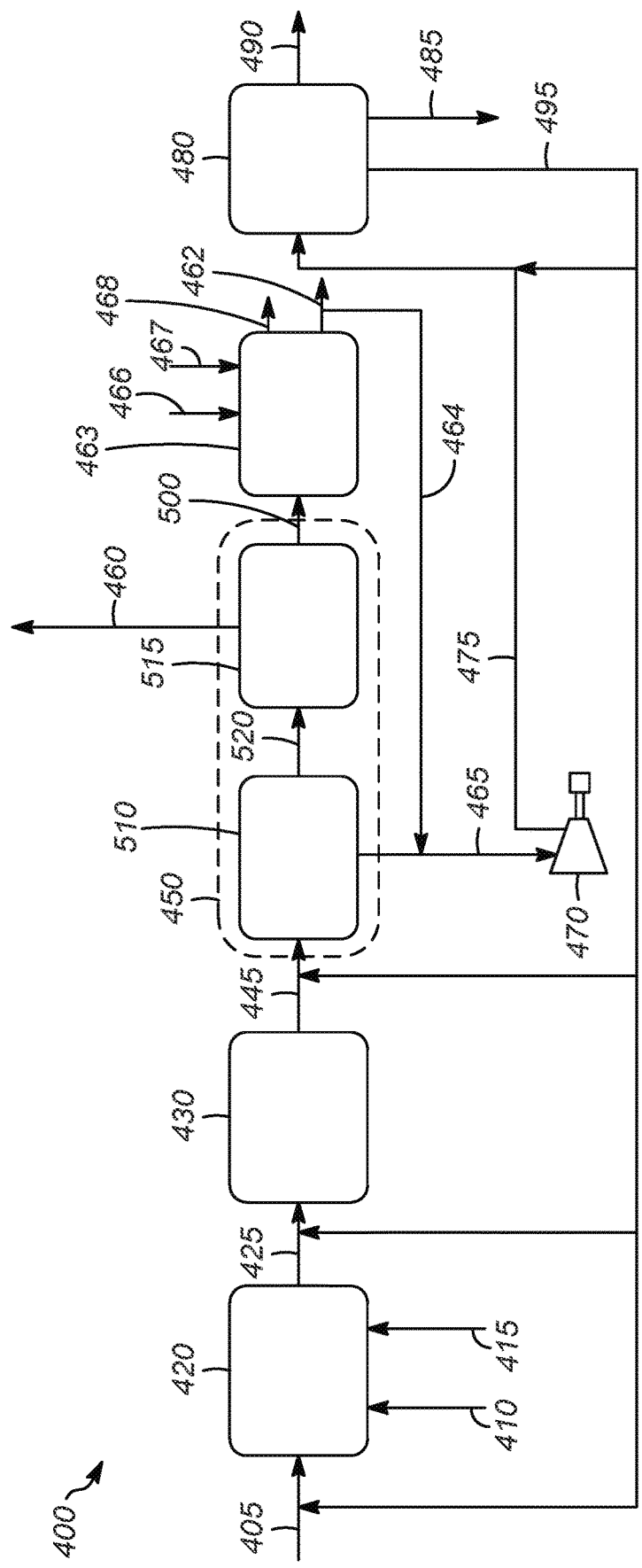
FIG. 4 is an illustration of another embodiment of a method of separating a hydrogen stream and a $CO_2$ stream from an effluent stream of a hydrogen production unit using the PSA system that produces at least two product streams of the present invention.

FIG. 4 illustrates another embodiment of a hydrogen production process 400 incorporating the PSA system that produces at least two product streams of the present invention.

Natural gas stream 405, oxygen stream 410, and steam stream 415 are sent to the ATR/GHR process unit 420. The effluent stream 425 is sent to the WGS unit 430.

The effluent stream 445 from the WGS unit 430 comprises hydrogen, $CO_2$, water, and at least one of methane, carbon monoxide, nitrogen, and argon. It has a temperature of about 30° C. to about 50° C. (after heat recovery and cooling), and a pressure of about 1,000 to about 6,000 kPa.

The effluent stream 445 is sent to the PSA system 450 with at least two product streams comprising two two-product PSA units 510, 515. The effluent stream 445 is sent to the first two-product PSA unit 510 where it is separated into a low-pressure tail gas stream 465 enriched in $CO_2$ and high-pressure stream 520 comprising substantially all the hydrogen, and a portion of the methane, the carbon monoxide, the nitrogen, and the argon. Low-pressure tail gas stream 465 has a low pressure of about 50 kPa to about 250 kPa. High-pressure stream 520 has a high pressure of about 1,000 to about 6,000 kPa. High-pressure stream 520 is sent to the second two-product PSA unit 515 where it is separated into high-pressure hydrogen stream 460 and low-pressure second stream 500.

Low-pressure second stream 500 comprising the methane, carbon monoxide, nitrogen, and argon is sent to the catalytic oxidation reaction zone 463, along with a portion 466 of the oxygen stream 410. The catalytic oxidation reaction of the methane and carbon monoxide and hydrogen forms $CO_2$ recycle stream 464. Water stream 467 is used for cooling the catalytic oxidation reactor 463 and produces steam stream 468. Steam stream 468 can be used in steam stream 415 and sent to the ATR/GHR reaction zone 420. $CO_2$ recycle stream 464 is recycled to the compressor 470. A bleed stream 462 is removed from $CO_2$ recycle stream 464 to prevent the build-up of impurities in the process. Water formed in catalytic oxidation zone 463 is removed in stream 485 in a downstream drier in $CO_2$ recovery system 480.

The high-pressure hydrogen stream 460, which is enriched in hydrogen and substantially free of carbon dioxide, methane, carbon monoxide, nitrogen, and argon, is recovered.

The low-pressure tail gas stream 465 enriched in $CO_2$ comprising substantially all the carbon dioxide is sent to compressor 470. The low-pressure compressed tail gas stream 475 has a pressure of about 50 kPa to about 250 kPa. It is sent to a $CO_2$ recovery unit 480 where it is dried to remove water stream 485, cooled to a temperature of about −20° C. to about −50° C., and separated into a bottoms stream 490 and an overhead stream 495. The bottoms stream 490 comprising liquid $CO_2$ is recovered. All or a portion of the overhead stream 495 can be recycled to the $CO_2$ recovery unit 480, the PSA system that produces at least two product streams 450, the WGS unit 430, and/or the ATR/GHR process unit 420.

Figure 5:
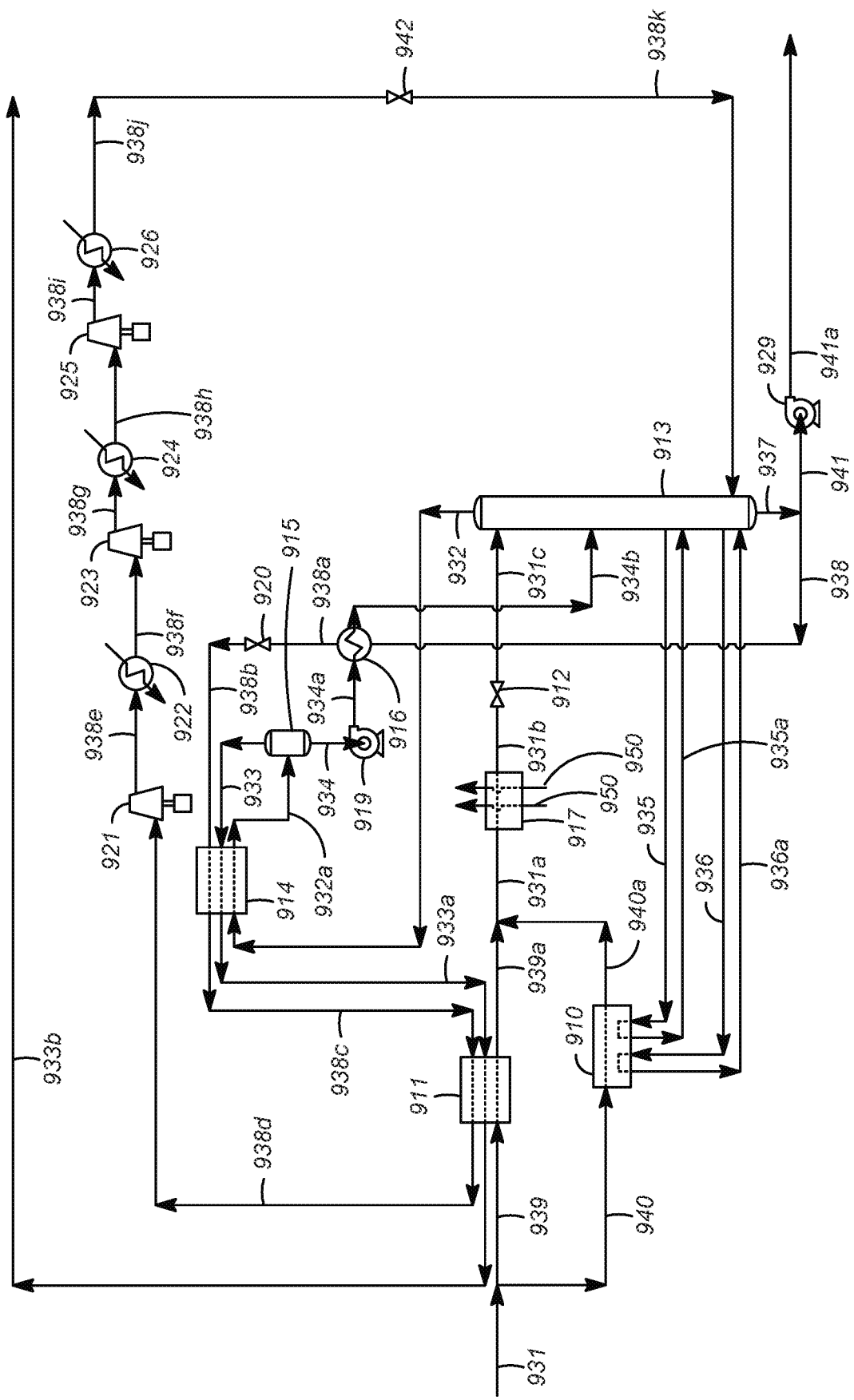
FIG. 5 is an illustration of one embodiment of a $CO_2$ recovery system using a dual refrigerant $CO_2$ fractionation process.

FIG. 5 is a process flow diagram showing the design of a $CO_2$ recovery system to remove carbon dioxide from hydrogen and lighter components from a synthetic gas stream. The process involves the use of a dual refrigerant $CO_2$ fractionation process.

In this process, inlet gas enters the plant as feed stream 931. The feed stream 931 is usually dehydrated to prevent hydrate (ice) formation under cryogenic conditions. Solid and liquid desiccants have both been used for this purpose.

The feed stream 931 is split into two streams (stream 939 and 940). Stream 939 is cooled in heat exchanger 911 by heat exchange with cool carbon dioxide vapor (stream 938*c*) and cold residue gas (stream 933*a*). Stream 940 is cooled in heat exchanger 910 by heat exchange with column reboiler liquids (stream 936) and column side reboiler liquids (stream 935). The cooled streams from heat exchangers 910 and 911 are recombined into stream 931*a*. Stream 931*a* is further cooled with commercial refrigerant 950 (propane or R-134A, for example) and the resultant stream (cooled stream 931*b*) is expanded to the operating pressure of fractionation tower 913 by expansion valve 912, cooling stream 931*c* before it is supplied to fractionation tower 913 at its top column feed point.

Overhead vapor stream 932 leaves fractionation tower 913 and is cooled and partially condensed in heat exchanger 914. The partially condensed stream 932*a* enters separator 915 where the vapor (cold residue gas stream 933) is separated from the condensed liquid stream 934. Condensed liquid stream 934 is pumped to slightly above the operating pressure of fractionation tower 913 by pump 919 before liquid stream 934*a* enters heat exchanger 916 and is heated and partially vaporized by heat exchange with carbon dioxide refrigerant from the bottom of the distillation column (described below). The partially vaporized stream 934*b* is thereafter supplied as feed to fractionation tower 913 at a mid-column feed point. A cold compressor (not shown) can be applied to overhead vapor stream 932 if higher pressure and/or lower carbon dioxide content is desired in the feed to the PSA system. If a compressor is used on this stream, then the pump 919 can be eliminated, and the liquid from separator 915 would then be sent to fractionation tower 913 via a liquid level control valve.

Fractionation tower 913 is a conventional distillation column containing a plurality of vertically spaced trays, one or more packed beds, or some combination of trays and packing. It also includes reboilers (such as the reboiler and the side reboiler described previously) which heat and vaporize a portion of the liquids flowing down the column to provide the stripping vapors which flow up the column to strip the column bottom liquid product stream 937 of hydrogen and lighter components. The trays and/or packing provide the necessary contact between the stripping vapors rising upward and cold liquid falling downward, so that the column bottom liquid product stream 937 exits the bottom of the tower, based on reducing the hydrogen and lighter component concentration in the bottom product to make a very pure carbon dioxide product.

Column bottom liquid product stream 937 is predominantly liquid carbon dioxide. A small portion (stream 938) is subcooled in heat exchanger 916 by liquid stream 934*a* from separator 915 as described previously. The subcooled liquid (stream 938*a*) is expanded to lower pressure by expansion valve 920 and partially vaporized, further cooling stream 938*b* before it enters heat exchanger 914. Stream 938*b* functions as refrigerant in heat exchanger 914 to provide cooling of partially condensed stream 932*a* as described previously, with the resulting carbon dioxide vapor leaving as stream 938*c*.

The cool carbon dioxide vapor from heat exchanger 914 (stream 938*c*) is heated in heat exchanger 911 by heat exchange with the feed gas as described previously. The warm carbon dioxide vapor (stream 938*d*) is then compressed to a pressure above the pressure of fractionation tower 913 in three stages by compressors 921, 923, and 925, with cooling after each stage of compression by discharge coolers 922, 924, and 926. The compressed carbon dioxide stream (stream 938*j*) is then flash expanded through valve 942 and returned to a bottom feed location in fractionation tower 913. The recycled carbon dioxide (stream 938*k*) provides further heat duty and stripping gas in fractionation tower 913. The remaining portion (stream 941) of column bottom liquid product stream 937 is pumped to high pressure by pump 929 so that stream 941*a* forms a high-pressure carbon dioxide stream which then flows to pipeline or reinjection. In certain instances, the carbon dioxide stream needs to be delivered as a sub-cooled liquid at lower pressure that can be transported in insulated shipping containers. For these cases, the carbon dioxide product (stream 941) is sub-cooled in heat exchanger 917 with refrigerant 950 before being let down to storage tank conditions. Therefore pump 929 is eliminated.

The cold residue gas stream 933 leaves separator 915 and provides additional cooling in heat exchanger 914. The warmed residue gas stream 933*a* is further heated after heat exchange with the feed gas in heat exchanger 911 as described previously. The warm residue gas stream 933*b* is then sent to the PSA system for further treating.

Figure 6:
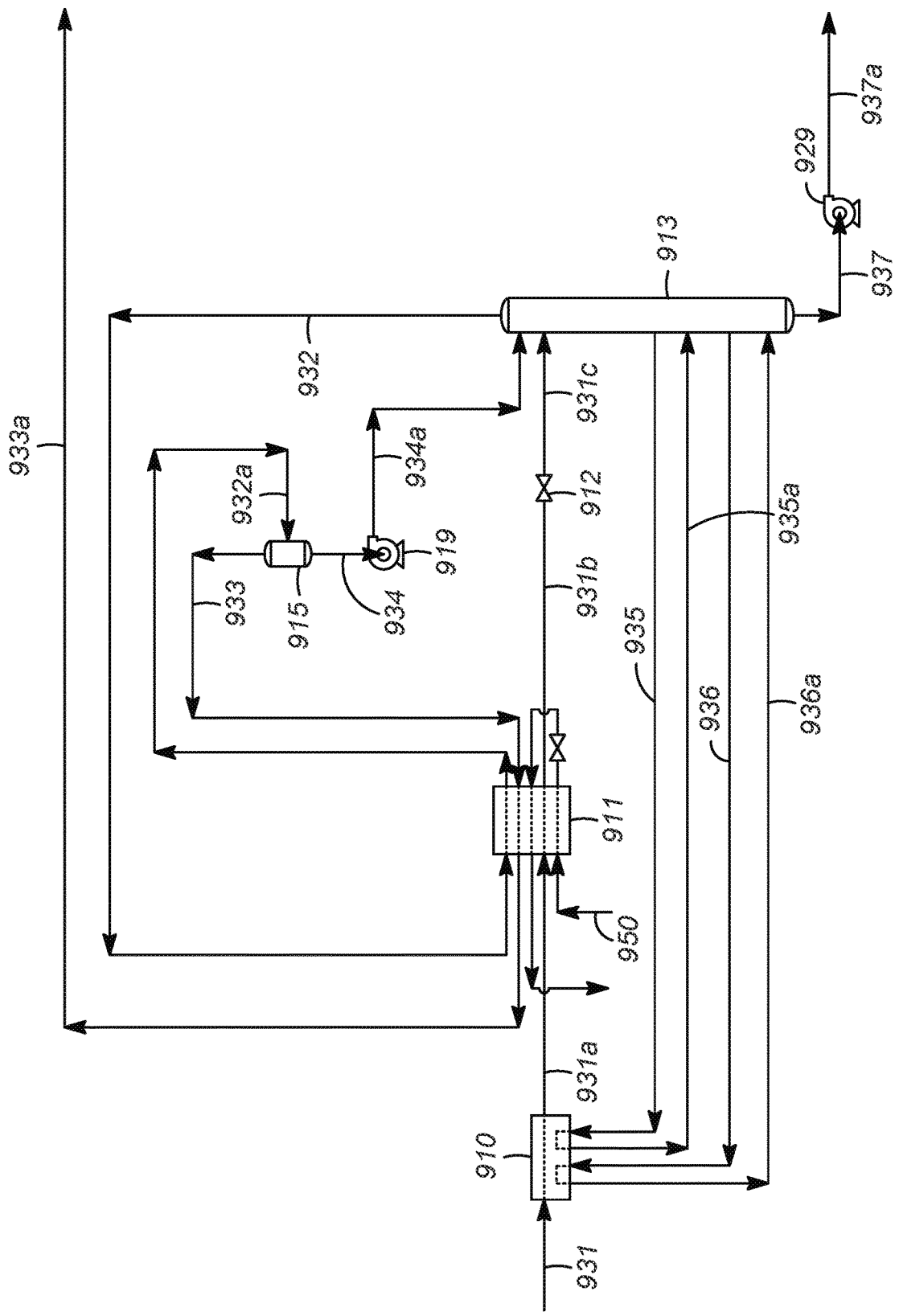
FIG. 6 is an illustration of another embodiment of a $CO_2$ recovery system using a mixed refrigerant $CO_2$ fractionation process.

FIG. 6 is a process flow diagram showing the design of a processing unit to remove carbon dioxide from hydrogen and lighter components from a synthetic gas stream. In this process, inlet gas enters the plant as feed stream 931. The process involves the use of a mixed refrigerant $CO_2$ fractionation process.

The feed stream 931 is usually dehydrated to prevent hydrate (ice) formation under cryogenic conditions. Solid and liquid desiccants have both been used for this purpose.

The feed stream 931 is cooled in heat exchanger 910 by heat exchange with column reboiler liquids (stream 936) and column side reboiler liquids (stream 935). Stream 931*a* is further cooled in heat exchanger 911 by heat exchange with cold residue gas stream 933, and a flash expanded multi-component mixed refrigerant stream comprised of both hydrocarbon and non-hydrocarbon components. The component mixture in the mixed refrigerant stream is designed to provide the most efficient cooling curve in heat exchanger 911 based on the inlet gas feed conditions. The further cooled stream 931*b* is expanded to the operating pressure of fractionation tower 913 by expansion valve 912 and sent to fractionation tower 913 at a mid-column feed point.

Overhead vapor stream 932 leaves fractionation tower 913 and is cooled and partially condensed in heat exchanger 911 with the mixed refrigerant stream. The partially condensed stream 932*a* enters separator 915 where the vapor (cold residue gas stream 933) is separated from the condensed liquid stream 934. Condensed liquid stream 934 is pumped to slightly above the operating pressure of fractionation tower 913 by pump 919 before liquid stream 934*a* is sent to fractionation tower 913 at the top feed point. A cold compressor (not shown) can be applied to overhead vapor stream 932 if higher pressure and/or lower carbon dioxide content is desired in the feed to the PSA system. If a compressor is used on this stream, then the pump 919 can be eliminated, and the liquid from separator 915 would then be sent to fractionation tower 913 via a liquid level control valve.

Fractionation tower 913 is a conventional distillation column containing a plurality of vertically spaced trays, one or more packed beds, or some combination of trays and packing. It also includes reboilers (such as the reboiler and the side reboiler described previously) which heat and vaporize a portion of the liquids flowing down the column to provide the stripping vapors which flow up the column to strip the column bottom liquid product stream 937 of hydrogen and lighter components. The trays and/or packing provide the necessary contact between the stripping vapors rising upward and cold liquid falling downward, so that the column bottom liquid product stream 937 exits the bottom of the tower, based on reducing the hydrogen and lighter component concentration in the bottom product to make a very pure carbon dioxide product.

Column bottom liquid product stream 937 is predominantly liquid carbon dioxide. Column bottom liquid product stream 937 is pumped to high pressure by pump 929 so that stream 937a forms a high-pressure carbon dioxide stream which then flows to pipeline or reinjection. In certain instances, the carbon dioxide stream needs to be delivered as a sub-cooled liquid at lower pressure that can be transported in insulated shipping containers. For these cases, the carbon dioxide product in column bottom liquid product stream 937 is sub-cooled in heat exchanger 911 with mixed refrigerant 950 before being let down to storage tank conditions. Therefore pump 929 is eliminated.

The warm residue gas stream 933a leaves heat exchanger 911 after heat exchange with the feed gas as described previously. The warm residue gas stream 933a is then sent to the PSA system for further treating.

EXAMPLES

The following examples are intended to further illustrate the integrated process. They are not meant to limit the claims of the invention to the particular details of the examples.

Example 1—PSA System Comprising Two PSA Units

Tables 1-10 provide the computer simulation results for a PSA system comprising two PSA units in series.

Table 1 shows an 8-bed cycle with 2 pressure equalization steps for the first PSA unit. It is an abbreviated form of the overall PSA cycle (called a sub-cycle) and are routinely used by practitioners to capture the minimum amount of required information to represent the complete multi-bed PSA cycle. These sub-cycles are replicated according to known procedures (with each row corresponding to one bed) in order produce complete cycle charts. It is understood that other variations of cycle details are possible. Table 2 provides a detailed description of the 8-bed sub-cycle in Table 1.

These cycles were used in the computer simulation to provide the results for the first two-product PSA unit 510 (FIG. 3) shown in Tables 3-5.

TABLE 1

8-Bed Sub-Cycle Chart (PSA-1)

|  |  | ADS |  |  |
|---|---|---|---|---|
|  |  | ADS |  |  |
| EQ1D |  | HOLD |  | EQ2D |
|  |  | PP |  |  |
|  |  | BD |  |  |
|  |  | PURGE |  |  |
|  | PURGE |  |  | EQ2U |
| EQ1 + REP |  |  | REP |  |

TABLE 2

Detailed Description of 8-bed PSA Cycle in Table 1 (PSA-1).

| Step | Abbreviation | Flow Direction | Time * | Starting Pressure, kPa | Ending Pressure, kPa |
|---|---|---|---|---|---|
| Adsorption | ADS | Up | 2x | 2450 | 2450 |
| Equalization 1 | EQ1D | Up | 0.3x | 2450 | 1520 |
| Equalization 2 | EQ2D | Up | 0.3x | 1520 | 900 |
| Provide Purge | PP | Up | x | 900 | 380 |
| Blowdown | BD | Down | x | 380 | 150 |
| Purge | PURGE | Down | 1.6x | 150 | 150 |
| Equalization 2 | EQ2U | Down | 0.3x | 150 | 710 |
| Equalization 1 | EQ1U | Down | 0.3x | 710 | 1520 |
| Feed Repressurization | FREP | Up | 0.7x | 1520 | 2450 |

* x = sub-cycle time (ranges from 50 to 150 sec)

A computer simulation was run for the first PSA unit using the cycle shown in Tables 1-2. The feed gas composition is shown in Table 3 and the bed loading is given in Table 4. As can be seen in Table 5, the low-pressure $CO_2$ stream contains 99.5% of the $CO_2$ and only 8.2% of the hydrogen in the effluent stream. The low-pressure $CO_2$ stream also includes about 24% of the CO, 29% of the $CH_4$, and about 16% of the nitrogen. The high-pressure gas stream contains over 93% of the hydrogen in the effluent stream and 0.5% of the $CO_2$, along with about 76% of the CO, over 70% of the $CH_4$, and about 84% of the nitrogen.

TABLE 3

Computer Simulation Results for PSA-1 using Cycle in Table 1 and Table 2.

|  | Feed Gas, Mol % |
|---|---|
| Hydrogen | 74.6 |
| Carbon Monoxide | 0.2 |
| Methane | 5.2 |
| Carbon Dioxide | 19.7 |
| Nitrogen | 0.2 |

Pressure: 2450 kPa
Temperature: 40° C.

TABLE 4

|  | Bed Loading, Vol % |
|---|---|
| NaY Zeolite | 30 |
| Silica Gel (bottom) | 70 |

TABLE 5

|  | % Recovery from Feed | | |
|---|---|---|---|
|  | Product (Stream D) | Tail Gas (Stream A) | Total |
| Hydrogen | 91.8 | 8.2 | 100.0 |
| Carbon Monoxide | 76.1 | 23.9 | 100.0 |
| Methane | 70.9 | 29.1 | 100.0 |
| Carbon Dioxide | 0.5 | 99.5 | 100.0 |
| Nitrogen | 84.2 | 15.8 | 100.0 |

Table 6 shows a 6-bed cycle with 2 pressure equalization steps for the second PSA unit, and Table 7 provides a detailed description of the 6-bed PSA cycle in Table 6.

These cycles were used in the computer simulation to provide the results for the second two-product PSA unit 210 (FIG. 3) shown in Tables 8-10.

TABLE 6

6-Bed Sub-Cycle Chart (PSA-2)

| | |
|---|---|
| ADS | |
| ADS | |
| E1D | E2D |
| PP | BD |
| PURGE | E2U |
| E1U/REP | REP |

TABLE 7

Detailed Description of 6-bed PSA Cycle in Table 4 (PSA-2).

| Step | Abbreviation | Flow Direction | Time * | Starting Pressure, kPa | Ending Pressure, kPa |
|---|---|---|---|---|---|
| Adsorption | ADS | Up | 2x | 2440 | 2440 |
| Equalization 1 | EQ1D | Up | 0.5x | 2440 | 2200 |
| Equalization 2 | EQ2D | Up | 0.5x | 2200 | 1900 |
| Provide Purge | PP | Up | 0.5x | 1900 | 1200 |
| Blowdown | BD | Down | 0.5x | 1200 | 150 |
| Purge | PURGE | Down | 0.5x | 150 | 150 |
| Equalization 2 | EQ2U | Down | 0.5x | 150 | 420 |
| Equalization 1 | EQ1U | Down | 0.5x | 420 | 620 |
| Repressurization | PREP | Down | 0.5x | 620 | 2440 |

* x = sub-cycle time (ranges from 30 to 150 sec)

A computer simulation was run for the second PSA unit using the cycle shown in Tables 6-7. The feed gas composition is shown in Table 8 and the bed loading is given in Table 9. As shown in Table 10, the high-pressure hydrogen stream contains 76% of the hydrogen in the incoming third stream, 7% of the nitrogen, and none of the CO, $CO_2$ or $CH_4$. The low-pressure second gas stream (tail gas stream) contains the remaining 24% of the hydrogen in the incoming third stream, 93% of the nitrogen, and all the $CO_2$, CO, and $CH_4$. This PSA can be designed to increase the hydrogen recovery in the high-pressure stream up to 90% or up to 93% without sacrificing purity, but this example reflects a scenario when a low hydrogen recovery may be more optimal, when a higher heat content with a low-carbon intensity is desired in the low-pressure second gas stream.

TABLE 8

Computer Simulation Results for PSA-2 using Cycle in Table 4 and Table 5.

| | Feed Gas (stream D), Mol % |
|---|---|
| Hydrogen | 94.3 |
| Carbon Monoxide | 0.2 |
| Methane | 5.0 |
| Carbon Dioxide | 0.1 |
| Nitrogen | 0.3 |

Pressure: 2440 kPa
Temperature: 40° C.

TABLE 9

| | Bed Loading, Vol % |
|---|---|
| NaX Zeolite | 25 |
| Activated Carbon | 70 |
| Activated Alumina (bottom) | 5 |

TABLE 10

| | % Recovery from Feed | | |
|---|---|---|---|
| | Product (Stream B) | Tail Gas (Stream C) | Total |
| Hydrogen | 75.8 | 24.2 | 100.0 |
| Carbon Monoxide | 0.0 | 100.0 | 100.0 |
| Methane | 0.0 | 100.0 | 100.0 |
| Carbon Dioxide | 0.0 | 100.0 | 100.0 |
| Nitrogen | 7 | 93.0 | 100.0 |

As used herein, the term "stream" can include various hydrocarbon molecules and other substances.

As used herein, the term "stream", "feed", "product", "part" or "portion" can include various hydrocarbon molecules, such as straight-chain and branched alkanes, naphthenes, alkenes, alkadienes, and alkynes, and optionally other substances, such as gases, e.g., hydrogen, or impurities, such as heavy metals, and sulfur and nitrogen compounds. Each of the above may also include aromatic and non-aromatic hydrocarbons.

As used herein, the term "overhead stream" can mean a stream withdrawn at or near a top of a vessel, such as a column.

As used herein, the term "bottoms stream" can mean a stream withdrawn at or near a bottom of a vessel, such as a column.

As used herein, the term "unit" can refer to an area including one or more equipment items and/or one or more sub-zones. Equipment items can include, but are not limited to, one or more reactors or reactor vessels, separation vessels, distillation towers, heaters, exchangers, pipes, pumps, compressors, and controllers. Additionally, an equipment item, such as a reactor, dryer, or vessel, can further include one or more zones or sub-zones.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top or overhead pressure is the pressure of the overhead vapor at the vapor outlet of the column. The bottom temperature is the liquid bottom outlet temperature. Net overhead lines and net bottoms lines refer to the net lines from the column downstream of any reflux or reboil to the column unless otherwise shown. Stripping columns may omit a reboiler at a bottom of the column and instead provide heating requirements and separation impetus from a fluidized inert media such as steam. Reboiled absorber columns may omit a condenser at the top of the column.

As depicted, process flow lines in the drawings can be referred to interchangeably as, e.g., lines, pipes, feeds, gases, products, discharges, parts, portions, or streams.

The term "passing" means that the material passes from a conduit or vessel to an object.

The terms "hydrogen-enriched" and "stream enriched in hydrogen" mean that the hydrogen content/concentration of the product stream is higher than the inlet gas stream. For example, in some embodiments, the product stream may contain greater than 40 mol % hydrogen, or greater than 50 mol %, or greater than 60 mol %, or greater than 70 mol %, or greater than 80 mol %, or greater than 90 mol %, or greater than 95 mol %, or greater than 98 mol %, or greater than 99 mol %, or greater than 99.9 mol %.

As used herein, the term "about" means within 10% of the value, or within 5%, or within 1%.

SPECIFIC EMBODIMENTS

While the following is described in conjunction with specific embodiments, it will be understood that this description is intended to illustrate and not limit the scope of the preceding description and the appended claims.

A first embodiment of the invention is a method of producing a hydrogen-enriched product and recovering $CO_2$ from an effluent stream of a hydrogen production unit comprising processing a feed stream comprising hydrocarbons or a carbonaceous feedstock in the hydrogen production unit to produce a synthesis gas mixture comprising hydrogen, carbon dioxide, water and at least one of methane, carbon monoxide, nitrogen, and argon; separating the effluent stream comprising the synthesis gas in a pressure swing adsorption (PSA) system that produces at least two product streams into at least a high-pressure hydrogen stream enriched in hydrogen, and a hydrogen-depleted low-pressure tail gas stream enriched in carbon dioxide; compressing the hydrogen depleted low-pressure tail gas stream in a compressor to form a compressed tail gas stream; separating the compressed tail gas stream in a $CO_2$ recovery system into a $CO_2$-enriched product stream and an overhead stream comprising a portion of the hydrogen, a portion of the carbon dioxide, and the at least one of the methane, the carbon monoxide, the nitrogen, and the argon; and recovering the high-pressure hydrogen stream. An embodiment of the invention is one, any or all of prior embodiments in this paragraph up through the first embodiment in this paragraph wherein the PSA system with at least two product streams comprises a three-product PSA unit and wherein separating the effluent stream from the hydrogen production unit comprises introducing the effluent stream into the three-product PSA unit having a three-product PSA cycle; removing the high-pressure hydrogen stream during a high pressure, co-current adsorption step in the PSA cycle, wherein the high-pressure hydrogen stream is substantially free of carbon dioxide, methane, carbon monoxide, nitrogen, and argon; removing a second gas stream during a co-current depressurization step in the three-product PSA cycle; and removing the low-pressure tail gas stream during at least one of a counter-current depressurizations step and a counter-current purge step in the three-product PSA cycle. An embodiment of the invention is one, any or all of prior embodiments in this paragraph up through the first embodiment in this paragraph wherein the PSA system that produces at least two product streams comprises a three-product PSA unit having a three-product PSA cycle comprising a high pressure, co-current adsorption and hydrogen removal step; at least one co-current depressurization step following the high pressure, co-current adsorption step and hydrogen removal step; a co-current depressurization and second gas removal step following the at least one co-current depressurization step; a counter-current blowdown step and $CO_2$ removal step following the intermediate pressure co-current depressurization and second gas removal step; a counter-current purge and $CO_2$ removal step following the counter-current blowdown step; at least one counter-current re-pressurization step following the counter-current purge and $CO_2$ removal step; and optionally a co-current feed re-pressurization step following the at least one counter-current re-pressurization step or a counter-current product re-pressurization following the at least one counter-current re-pressurization step. An embodiment of the invention is one, any or all of prior embodiments in this paragraph up through the first embodiment in this paragraph wherein the PSA system that produces at least two product streams comprises two PSA units and wherein separating the effluent stream comprises; introducing the effluent stream into the first PSA unit and separating the effluent stream into the low-pressure tail gas stream enriched in $CO_2$ and the high-pressure hydrogen stream wherein the high-pressure hydrogen stream comprises more than 75% of the hydrogen, and a portion of the at least one of the methane, the carbon monoxide, the nitrogen, and the argon; and passing the low-pressure tail gas stream enriched in $CO_2$ to the compressor. An embodiment of the invention is one, any or all of prior embodiments in this paragraph up through the first embodiment in this paragraph further comprising separating the high-pressure hydrogen stream in the second two-product PSA unit into a second high-pressure hydrogen stream and a second gas stream, wherein the second high-pressure hydrogen stream is substantially free of carbon dioxide, methane, carbon monoxide, nitrogen, and argon, and wherein the second gas stream comprises the at least one of the methane, the carbon monoxide, the nitrogen, and the argon; and recovering the second high-pressure hydrogen stream An embodiment of the invention is one, any or all of prior embodiments in this paragraph up through the first embodiment in this paragraph wherein the hydrogen production unit is a steam reforming unit with an optional gas heated reformer, autothermal reforming unit with an optional gas heated reformer, a gasification unit, or a partial oxidation unit. An embodiment of the invention is one, any or all of prior embodiments in this paragraph up through the first embodiment in this paragraph wherein the $CO_2$ recovery system comprises a refrigerated $CO_2$ fractionation process wherein refrigeration cooling is provided by at least two refrigeration circuits wherein one of the refrigeration circuits utilizes a portion of the $CO_2$-enriched product stream recovered from a distillation column in the $CO_2$ recovery system; or a single closed loop multi-component mixed refrigerant system. An embodiment of the invention is one, any or all of prior embodiments in this paragraph up through the first embodiment in this paragraph further comprising at least one of recycling at least a portion of a second gas stream from the PSA system that produces at least two product streams to the hydrogen production unit; recycling at least a portion of a second gas stream from the PSA system that produces at least two product streams to a water gas shift process unit; and sending at least a portion of the second gas stream from the PSA system that produces at least two product streams to a combustion unit. An embodiment of the invention is one, any or all of prior embodiments in this paragraph up through the first embodiment in this paragraph further comprising at least one of recycling at least a portion of the overhead stream to the PSA system that produces at least two product streams; recycling at least a portion of the overhead stream to a water gas shift process unit; and recycling at least a portion of the overhead stream to the $CO_2$ recovery system. An embodiment of the invention is one, any or all of prior embodiments in this paragraph up through the first embodiment in this paragraph further comprising compressing the effluent stream before separating the effluent stream. An embodiment of the invention is one, any or all of prior embodiments in this paragraph up through the first embodiment in this paragraph further comprising oxidizing the methane and the carbon monoxide in a second gas stream from the PSA system that produces at least two product streams with oxygen in a catalytic oxidation unit to produce water, $CO_2$, and heat; and sending at least a portion of the $CO_2$ from the catalytic oxidation unit to the compressor. An embodiment of the invention is one, any or all of prior embodiments in this paragraph up through the first embodiment in this paragraph further comprising selectively bypassing the compressor and the $CO_2$ recovery system and sending a second gas stream from the PSA system that produces at least two product streams to a combustion unit. An embodiment of the invention is one, any or all of prior embodiments in this paragraph up through the first embodiment in this paragraph wherein the hydrogen production unit includes a water gas shift (WGS) unit producing a WGS effluent stream and wherein the effluent from the hydrogen production unit comprises the WGS effluent stream, and further comprising heat exchanging the WGS effluent stream with a process stream to form a cooled effluent steam and a pre-heated process stream; and recovering waste heat from the cooled effluent stream to generate steam using a process involving a reaction of reversible oligomerization of phosphoric acid. An embodiment of the invention is one, any or all of prior embodiments in this paragraph up through the first embodiment in this paragraph further comprising; drying the compressed tail gas stream in a dryer to form a dried tail gas stream; and cooling the dried tail gas stream in a chiller to form a chilled tail gas stream, and wherein separating the compressed tail gas stream comprises separating the chilled tail gas stream. An embodiment of the invention is one, any or all of prior embodiments in this paragraph up through the first embodiment in this paragraph wherein the dried tail gas stream is cooled to a temperature of about −20° C. to about −50° C. An embodiment of the invention is one, any or all of prior embodiments in this paragraph up through the first embodiment in this paragraph wherein at least one of the high-pressure hydrogen stream is removed at a pressure in the range of about 1,000 kPa to about 6,000 kPa; the low-pressure tail gas stream is removed at a pressure in the range of about 100 kPa to about 250 kPa; and optionally a second gas stream is removed from the PSA system that produces at least two product streams at a pressure in the range of about 100 kPa to about 450 kPa.

A second embodiment of the invention is an apparatus for producing hydrogen and recovering $CO_2$ from an effluent stream of a hydrogen production unit comprising a hydrogen production process unit having at least one inlet and at least one outlet, a PSA system having at least an inlet, a high-pressure hydrogen outlet, and a low-pressure tail gas outlet, the PSA system inlet in fluid communication with the outlet of the hydrogen production unit; a compressor having an inlet and an outlet, the low-pressure tail gas outlet in fluid communication with the compressor inlet; and a $CO_2$ recovery system having an inlet, a first outlet, and an overhead outlet, the $CO_2$ recovery system inlet in fluid communication with the compressor outlet. An embodiment of the invention is one, any or all of prior embodiments in this paragraph up through the second embodiment in this paragraph wherein at least one of the $CO_2$ recovery system overhead outlet is in fluid communication with the inlet of the PSA system that produces at least two product streams; the $CO_2$ recovery system overhead outlet is in fluid communication with an inlet of a water gas shift process unit; and wherein the PSA system that produces at least two product streams further comprises a second gas stream outlet and wherein at least one of the second gas stream outlet s in fluid communication with the inlet of the hydrogen production process unit; a second gas stream outlet is in fluid communication with an inlet to a water gas shift process unit; the second gas stream outlet is in fluid communication with an inlet to a combustion unit; and the second gas stream outlet is in fluid communication with an inlet to a catalytic oxidation unit, and an outlet of the catalytic oxidation unit is in fluid communication with the inlet of the compressor. An embodiment of the invention is one, any or all of prior embodiments in this paragraph up through the second embodiment in this paragraph further comprising a dryer and a chiller positioned between the compressor and the $CO_2$ recovery system; the dryer having an inlet and at least one outlet, the dryer inlet in fluid communication with the compressor outlet; the chiller having a gas inlet, a gas outlet, a chilling fluid inlet and a chilling fluid outlet, the chiller gas inlet in fluid communication with the dryer outlet, the chiller fluid inlet in fluid communication with a source of chilling fluid; and the $CO_2$ recovery system inlet in fluid communication with the chiller gas outlet. An embodiment of the invention is one, any or all of prior embodiments in this paragraph up through the second embodiment in this paragraph wherein the PSA system that produces at least two product streams comprises a first PSA unit having an inlet and first and second outlets, and a second PSA unit having an inlet and first and second outlets; wherein the inlet of the first PSA unit comprises the inlet of the PSA system that produces at least two product streams; wherein the first outlet of the first PSA unit comprises the low-pressure $CO_2$ outlet; the inlet of the second PSA unit is in fluid communication with the second outlet of the first PSA unit; wherein the first outlet of the second PSA unit comprises the high pressure hydrogen outlet and the second outlet of the second PSA unit comprises the second gas outlet.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. A method of producing a hydrogen-enriched product and recovering $CO_2$ from an effluent stream of a hydrogen production unit comprising:
   processing a feed stream comprising hydrocarbons or a carbonaceous feedstock in the hydrogen production unit to produce a synthesis gas mixture comprising hydrogen, carbon dioxide, water and at least one of methane, carbon monoxide, nitrogen, and argon;
   separating the effluent stream comprising the synthesis gas in a three-product pressure swing adsorption (PSA) unit that produces at least three product streams into at least a high-pressure hydrogen stream enriched in hydrogen, a hydrogen-depleted low-pressure tail gas stream enriched in carbon dioxide, and a second gas stream, the three-product PSA unit having a three-product PSA cycle, and wherein the second gas stream is produced in a co-current depressurization step in the three-product PSA cycle and has an intermediate pressure between the high-pressure hydrogen stream and the low-pressure tail gas stream;

compressing the hydrogen depleted low-pressure tail gas stream in a compressor to form a compressed tail gas stream;

separating the compressed tail gas stream in a $CO_2$ recovery system into a $CO_2$-enriched product stream and an overhead stream comprising a portion of the hydrogen, a portion of the carbon dioxide, and the at least one of the methane, the carbon monoxide, the nitrogen, and the argon; and recovering the high-pressure hydrogen stream.

2. The method of claim 1 wherein the three-product PSA cycle comprises:
a high pressure, co-current adsorption and hydrogen removal step;
at least one co-current depressurization step following the high pressure, co-current adsorption step and hydrogen removal step;
a co-current depressurization and second gas removal step following the at least one co-current depressurization step;
a counter-current blowdown step and $CO_2$ removal step following the intermediate pressure co-current depressurization and second gas removal step;
a counter-current purge and $CO_2$ removal step following the counter-current blowdown step;
at least one counter-current re-pressurization step following the counter-current purge and $CO_2$ removal step; and
optionally a co-current feed re-pressurization step following the at least one counter-current re-pressurization step or a counter-current product re-pressurization following the at least one counter-current re-pressurization step.

3. The method of claim 1 wherein the hydrogen production unit is a steam reforming unit with an optional gas heated reformer, autothermal reforming unit with an optional gas heated reformer, a gasification unit, or a partial oxidation unit.

4. The method of claim 1 wherein the $CO_2$ recovery system comprises a refrigerated $CO_2$ fractionation process wherein refrigeration cooling is provided by:
a single closed loop multi-component mixed refrigerant system.

5. The method of claim 1 further comprising at least one of:
recycling at least a portion of the second gas stream from the three-product PSA unit to the hydrogen production unit;
recycling at least a portion of the second gas stream from the three-product PSA unit to a water gas shift process unit; and
sending at least a portion of the second gas stream from the three-product PSA unit to a combustion unit.

6. The method of claim 1 further comprising at least one of:
recycling at least a portion of the overhead stream to the three-product PSA unit;
recycling at least a portion of the overhead stream to a water gas shift process unit; and
recycling at least a portion of the overhead stream to the $CO_2$ recovery system.

7. The method of claim 1 further comprising:
compressing the effluent stream before separating the effluent stream.

8. The method of claim 1 further comprising:
oxidizing the methane and the carbon monoxide in the second gas stream from the three-product PSA unit with oxygen in a catalytic oxidation unit to produce water, $CO_2$, and heat; and
sending at least a portion of the $CO_2$ from the catalytic oxidation unit to the compressor.

9. The method of claim 1 further comprising:
selectively bypassing the compressor and the $CO_2$ recovery system and sending the second gas stream from the three-product PSA unit to a combustion unit.

10. The method of claim 1 wherein the hydrogen production unit includes a water gas shift (WGS) unit producing a WGS effluent stream and wherein the effluent from the hydrogen production unit comprises the WGS effluent stream, and further comprising:
heat exchanging the WGS effluent stream with a process stream to form a cooled effluent steam and a pre-heated process stream; and
recovering waste heat from the cooled effluent stream to generate steam using a process involving a reaction of reversible oligomerization of phosphoric acid.

11. The method of claim 1 further comprising;
drying the compressed tail gas stream in a dryer to form a dried tail gas stream; and
cooling the dried tail gas stream in a chiller to form a chilled tail gas stream, and wherein separating the compressed tail gas stream comprises separating the chilled tail gas stream.

12. The method of claim 11 wherein the dried tail gas stream is cooled to a temperature of about −20° C. to about −50° C.

13. The method of claim 1 wherein at least one of:
the high-pressure hydrogen stream is removed at a pressure in the range of about 1,000 kPa to about 6,000 kPa;
the low-pressure tail gas stream is removed at a pressure in the range of about 100 kPa to about 250 kPa; and
optionally the second gas stream is removed from the three-product PSA unit at a pressure in the range of about 100 kPa to about 450 kPa.

14. An apparatus for producing hydrogen and recovering $CO_2$ from an effluent stream of a hydrogen production unit comprising:
a hydrogen production process unit having at least one inlet and at least one outlet,
a three-product PSA unit having at least an inlet, a high-pressure hydrogen outlet, an intermediate-pressure second gas outlet, and a low-pressure tail gas outlet, the three-product PSA unit inlet in fluid communication with the outlet of the hydrogen production unit;
a compressor having an inlet and an outlet, the low-pressure tail gas outlet in fluid communication with the compressor inlet;
a $CO_2$ recovery system having an inlet, a first outlet, and an overhead outlet, the $CO_2$ recovery system inlet in fluid communication with the compressor outlet, the $CO_2$ recovery system overhead outlet in fluid communication with the inlet of the $CO_2$ recovery system, the inlet of the three-product PSA unit, or an inlet of a water gas shift process unit, or an inlet of the hydrogen production process unit, or combinations thereof; and the intermediate-pressure second gas stream outlet in fluid communication with the inlet of the hydrogen production process unit; an inlet to a water gas shift process unit; an inlet to a combustion unit; or an inlet to a catalytic oxidation unit and an outlet of the catalytic oxidation unit in fluid communication with the inlet of the compressor; or combinations thereof.

15. The apparatus of claim 14 further comprising:

a dryer and a chiller positioned between the compressor and the $CO_2$ recovery system;

the dryer having an inlet and at least one outlet, the dryer inlet in fluid communication with the compressor outlet;

the chiller having a gas inlet, a gas outlet, a chilling fluid inlet and a chilling fluid outlet, the chiller gas inlet in fluid communication with the dryer outlet, the chiller fluid inlet in fluid communication with a source of chilling fluid; and the $CO_2$ recovery system inlet in fluid communication with the chiller gas outlet.

\* \* \* \* \*